Patented Jan. 21, 1947

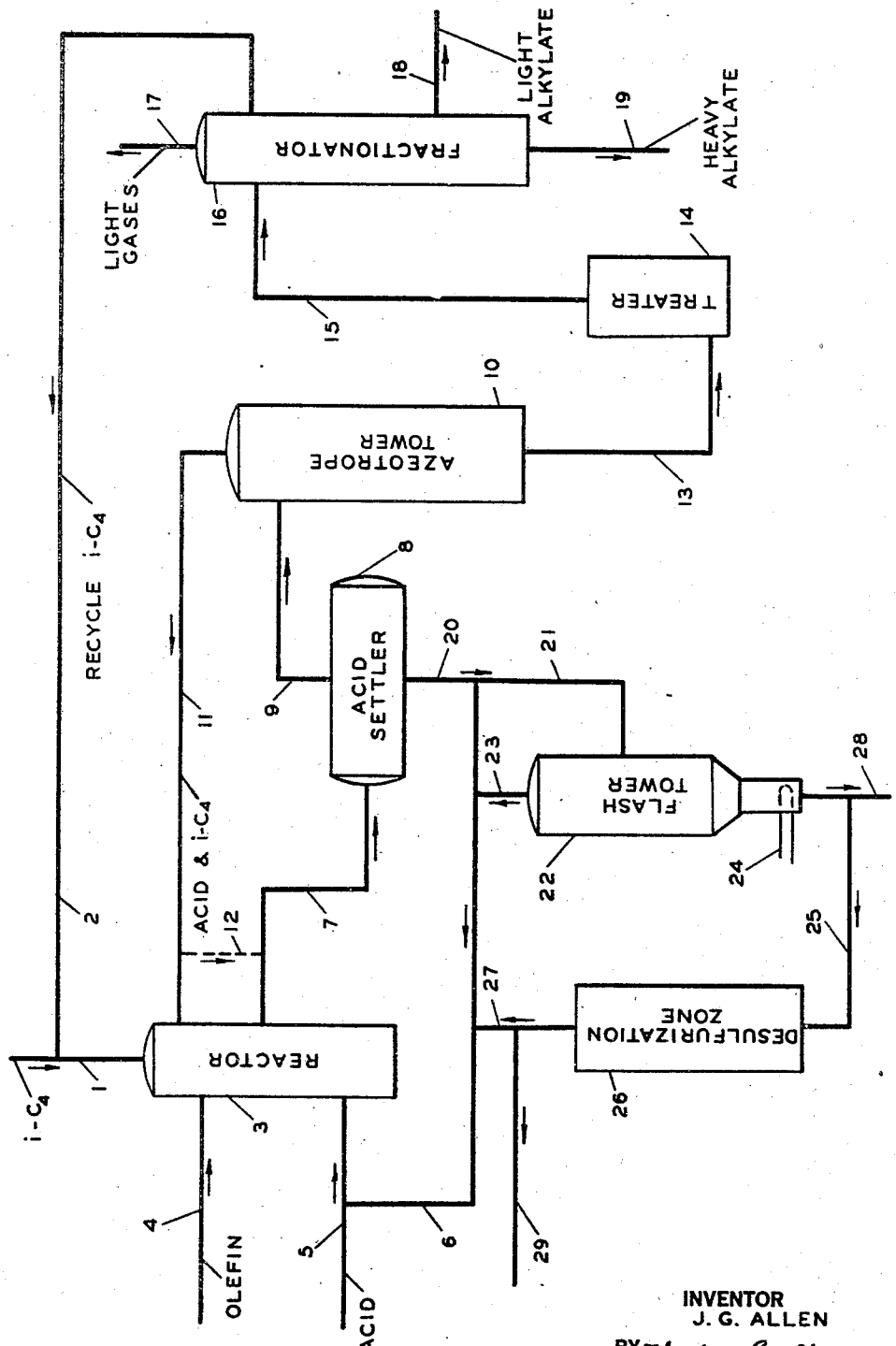

2,414,626

UNITED STATES PATENT OFFICE 2,414,626

DESULFURIZATION IN HYDROCARBON CONVERSIONS

John Gordon Allen, Bartlesville, Okla., assignor to Phillips Petroleum Company, a corporation of Delaware Application December 23, 1944, Serial No. 569,594

7 Claims. (Cl. 260—683.4)

This invention relates to the conversion and desulfurization of hydrocarbons. In one of the more particular aspects it relates to the alkylation and desulfurization of hydrocarbons in the presence of hydrogen fluoride and to the desulfurization and recycle of acid soluble oils which are formed during the process.

The use of hydrofluoric acid in hydrocarbon conversions is well known to the art. For example, it is used as a catalyst in organic reactions involving alkylation, isomerization, polymerization, cyclization, hydrofluorination and fluorination. Perhaps the most important industrial process at the present time using hydrofluoric acid as catalyst is the alkylation of low-boiling hydrocarbons, such as isobutane and/or isopentane with propylene, various butylenes and/or various amylenes, to form valuable higher boiling compounds.

Such alkylation processes are described, for instance, in Frey Patents 2,322,800, issued June 29, 1943, and 2,317,901, issued April 27, 1943, and also in an article by Frey in Chemical and Metallurgical Engineering, 1943, vol. 50, pages 126 to 128 (November, 1943). In such processes, the reactants are intimately mixed in the liquid phase at temperatures from 35° to 100° F. with liquid concentrated hydrofluoric acid for reaction periods ranging from about 1 to 30 minutes, and the mixture is passed to a settling zone in which a liquid hydrocarbon phase and a liquid acid phase are separated.

The hydrocarbon phase, which contains a substantial amount of hydrofluoric acid, is withdrawn to a fractionating tower from which an azeotrope of acid and hydrocarbon is withdrawn overhead and recycled to the reactor and/or settling zone. The heavier material which collects in the bottom of the azeotrope fractionator and which contains the desired alkylate product is passed through a fluorine removal zone, such as a bauxite treater, and is separated into fractions of the desired boiling ranges.

The lower, or acid, phase in the settling zone is withdrawn and recycled to the reactor. During the process of alkylation a relatively small amount of "acid-soluble" oils are formed and remain dissolved in the acid phase of the separation. By acid soluble oils is meant those acid soluble hydrocarbon derivatives formed during the process of alkylation of low-boiling aliphatic hydrocarbons carried out in the presence of substantially anhydrous HF as a catalyst. These oils, which may be formed at the rate of 1 to 2 or more per cent of the alkylate produced, vary in composition but are unsaturated, consisting primarily of aromatic compounds with some olefins, paraffins, and naphthenes. A typical example of these acid-soluble oils has the following characteristics:

| | |
|---|---|
| Specific gravity at 25° C. | 0.8881 |
| Refractive index (25° C.) | 1.5013 |
| Unsaturation (cc. 1% bromine solution per cc.) | 34.9 |
| Fluorine, per cent by weight | 0.0013 |
| Solubility in 98% $H_2SO_4$ | 80% |
| Aniline point | 35° C. |
| Color | Dark red to brown in transmitted light |
| Initial boiling point | 110° C. |
| 70% distilled | 425° C. |

Processes for the separation of the acid and these acid-soluble oils have been described in copending applications of Frey, Serial Number 429,961 filed February 7, 1942, and Vinyard, Serial No. 545,415 filed July 18, 1944.

The presence of certain proportions of these acid soluble oils during alkylation has been found to be desirable to effect desulfurization of the material in the reaction zone, to provide a better contact between the acid and the hydrocarbon reactants by the mutual solubility of the oils in both, and to afford a control of the composition of the acid stream to the reactor.

In hydrocarbon conversions, such as the alkylation process outlined above, a substantial amount of sulfur and/or sulfur compounds is frequently introduced into the process by their presence in the feed stocks. Any appreciable quantity of sulfur in the feed stocks is usually transmitted to the desirable fractions of the conversion effluent in deleterious amounts. Even a very small content of sulfur in gasolines may be responsible for bad odor, corrosive properties, discoloration in light, lowering of octane number, and poor response to tetraethyl lead. Thus, the maximum content by specification of all grades of aviation gasoline is limited to 0.05 per cent and much lower concentrations are preferred. For the reasons given, then, it is especially desirable to keep the sulfur content of gasolines as low as possible.

It has now been found that an effective control over the sulfur content of conversion products may be realized through the use of the acid-soluble oils described above in accordance with the present invention. Analyses of the acid-soluble oils recovered from the acid phase of the effluent from an alkylation process as described show that large amounts of the sulfur introduced into the reaction zone are concentrated therein. These oils, in addition to being soluble in hydrofluoric acid and partially soluble in hydrocarbons, exhibit the desirable characteristic of combining with and extracting the sulfur compounds which are present in the process. When the sulfur is not removed, its concentration builds up in the effluent from the reaction zone and sulfur appears in higher percentages in the desirable fraction of the reaction products with the deleterious effects consistent with the sulfur content.

It is, therefore, an object of this invention to describe a process for the desulfurization of the products of a hydrocarbon conversion process.

Another object is to effect the desulfurization of hydrocarbons during a process of conversion.

Still another object is to effect desulfurization of the products of alkylation by means of acid-soluble oils.

A further object of this invention is to describe the desulfurization of alkylate by means of acid-soluble oils which are formed in the process, desulfurized and recycled to the process.

Other objects and advantages will be apparent to those skilled in the art from the disclosure and description which follow.

In one embodiment of the present invention, the acid-soluble oils and hydrofluoric acid in the acid phase from the settling zone of an alkylation process are separated by flash distillation and the acid-soluble oils are passed to a desulfurization zone in which a substantial proportion of the sulfur is removed. The desulfurized oils are added to the recycle acid stream in an amount sufficient to effect a substantial reduction in sulfur concentration of the reaction products and to maintain the desired composition of the acid phase entering the reaction zone.

The process of the present invention may be more clearly understood by a description of its application in the alkylation of isobutane and butene employing hydrofluoric acid as catalyst. Referring to the accompanying drawing, which shows diagrammatically a suitable arrangement for practicing the invention, a low-boiling paraffin, such as isobutane is introduced through line 1 and recycle line 2 into reactor 3 in which it is mixed with an olefin-containing fraction, such as a butane-butylene mixture from line 4, so that the mol ratio of isobutane to olefins is between 3:1 and 10:1, preferably about 6:1. Liquid hydrofluoric acid catalyst is introduced through line 5 and acid recycle line 6 so that the ratio of hydrocarbon to acid will be between about 0.5:1 and 10:1 on a volume basis. After a contact time within the reactor of from 1 to 30 minutes the mixture is withdrawn by line 7 to a settling zone 8 in which the mixture separates into a hydrocarbon and an acid phase.

The hydrocarbon phase which contains substantial quantities of hydrogen fluoride is withdrawn through line 9 to an azeotrope distillation tower 10. The overhead from distillation tower 10 contains an azeotropic mixture of acid and hydrocarbons, principally isobutane, which is recycled to the reactor by line 11 or to the acid settler through line 12. The bottoms from the azeotrope tower are withdrawn via line 13 to a treating zone 14, such as a tower containing bauxite, in which organic fluoride products and hydrogen fluoride entrained from the reaction zone are removed. The effluent from the treater passes by line 15 into a fractionating zone 16 in which light gases, unreacted isobutane, and light and heavy alkylate are separated. Unreacted isobutane is recycled to the reactor by line 2. Light gases are removed overhead by line 17 and light and heavy alkylates are removed by lines 18 and 19, respectively.

From the settling zone 8 the lower acid layer, which may contain as much as about 10 to 15 per cent of hydrocarbon material and water, is withdrawn via line 20 and recycled to the reactor through line 6. A desired portion of the acid phase is passed through line 21 to a flash tower 22 from which substantially pure hydrogen fluoride is removed overhead by lines 23 and recombined with recycle in line 6. If desired, the heavier material collecting in the bottom of the flash tower may be heated by means of heating coil 24 to distill off more of the lighter compounds or stripped of these compounds by heated light gases. The heavier organic material collecting in the bottom of the tower comprises acid-soluble oils and water which, in accordance with this invention, are withdrawn via line 25 to a desulfurization zone 26. Desulfurization of the oils may be effected by any suitable means known to those versed in the art, such as selective adsorption and/or selective absorption. Charcoal has been found satisfactory as an adsorbent in processes of desulfurization in which the sulfur compounds are adsorbed directly or first treated with an alkaline solution of litharge whereby the sulfur compounds are converted to disulfides and lead compounds which are then adsorbed on the charcoal. An additional treatment with bauxite or other suitable desiccant may be desirable to adsorb and remove any water which may have been introduced into or formed during the reaction. The desulfurized oils are withdrawn from the desulfurization zone by line 27 and passed to recycle with the acid in line 6. If desired all or a portion of the acid-soluble oils may be withdrawn from the system, before desulfurization by line 28, or after desulfurization by line 29.

Various pumps, valves and other conventional equipment incidental to the operation of the system as described have been omitted from the diagram and description. These will be apparent to one skilled in the art to which the invention pertains. Likewise, it is understood that reasonable care will be exercised in the selection and use of equipment constructed of material which is recognized to withstand corrosion in that part of the system which is in contact with the acid, such as Monel and other metals listed in an article by C. M. Fehr, "Materials of construction for anhydrous hydrofluoric acid," in Chemical and Metallurgical Engineering, 1943, vol. 50, page 129 (November, 1943), and in the article by Frey referred to hereinbefore.

The quantity of acid recycle phase withdrawn to the desulfurization zone is determined by the sulfur concentration within the reaction zone and the characteristics of the acid recycle stream. In operations in which a substantial quantity of sulfur is introduced into the reactor, the concentration of sulfur in the acid-soluble oils, which are concentrated in the acid phase from the settling zone, will be high. Also, in an operation in which the sulfur in the reaction zone has become excessive by reason of sulfur build-up through continuous recycle of untreated recycle acid, the concentration of sulfur in the acid-soluble oils will be undesirably high. In such cases, the amount of acid recycle withdrawn to the desulfurization zone may constitute a substantial proportion of the recycle.

In addition to the effectiveness of having an increased amount of sulfur-absorbent acid-soluble oil present in the reaction zone, is the desirability of having absorbent oil present throughout the entire length of the reaction time. Without the introduction of a desulfurizing agent, such as sulfur-poor acid-soluble oils, the desulfurization within the reaction zone would depend upon the action of these oils formed during the reaction. Such dependency involves a shorter contact time of the reactants and products with the absorbent oils and thus decreases the efficiency of the desulfurization action. An increased concentration of acid-soluble oils and longer residence time in the reaction zone assures better absorption and sulfur removal by these oils. Furthermore, the introduction of the oils with the acid recycle stream is advantageous since the oils are mutually soluble in the acid and in the hydrocarbon reactants, thereby producing a better contact between the two. A further advantage of the oils is the control of acid concentration. Being soluble in the acid, the oils from the desulfurization step may be returned to the recycle acid stream in a sufficient amount to serve as a diluent of the acid and establish the desired concentration of acid for introduction into the reaction zone. The optimum acid concentration has been found to be between about 85 to 95 per cent for the alkylation process above. Examination of a few preliminary test operations will determine the optimum conditions of acid concentration, the most desirable amount of recycle acid to withdraw for further treatment, and other factors for the alkylation of other hydrocarbons.

The advantages of this invention are demonstrated by the following specific example of hydrofluoric acid alkylation: A butene-amylene feed, containing 32.6 per cent olefinic material and 0.009 per cent sulfur, was admixed with a 96 per cent isobutane stock containing 0.001 per cent sulfur in an isobutane-to-olefin ratio of 6.96 to 1. Hydrofluoric acid of 88.5 per cent concentration was introduced into the mixing zone at an acid-to-hydrocarbon ratio of 0.95 to 1. After a contact time of 35 minutes, the mixture was withdrawn from the reaction zone to a settling tank in which separation of hydrocarbon and acid was effected. The hydrocarbon layer was withdrawn to an azeotropic fractionator from which an azeotropic mixture of acid and unreacted isobutane was removed overhead and recycled to the reactor. The hydrocarbon mixture collecting in the bottom of the fractionator was removed, passed through bauxite treaters for the extraction of fluorine compounds and of some sulfur compounds, and fractionated into light and heavy alkylate and other fractions. The acid layer was withdrawn from the settler and recycled to the reactor. Five per cent of the acid recycle stream was by-passed to the acid flash tower from which a 95 per cent hydrofluoric acid vapor was removed overhead and added to the main stream of recycle acid. Acid-soluble oils and water were removed from the bottom of the flash tower and passed to the desulfurization zone. In this zone the oils were subjected to treatment with an aqueous alkaline solution of litharge, separated therefrom by stratification, and passed through a tower of adsorptive charcoal which adsorbs the sulfide compounds and a tower containing calcined bauxite to absorb moisture and dehydrate the oils. After dehydration and desulfurization, the acid-soluble oils were then recycled to the reactor.

Of the 47.7 pounds per day of sulfur introduced into the system through the hydrocarbon feed, about 60 per cent was accounted for in the fractions from the final fractionation of the hydrocarbon phase and in the acid-soluble oils from the flash tower. A large portion of the balance of the sulfur was removed by the bauxite treater following the azeotropic fractionator and a small amount of sulfur was recycled in the untreated acid recycle. The acid-soluble oils contained 38 per cent of the total sulfur introduced in the system and the desired light alkylate fraction contained 13.3 per cent, which represented a concentration in this fraction of 0.0021 per cent. In this example the concentration of the acid-soluble oils was about 2 per cent of the acid and the concentration of sulfur in these oils amounted to about 1 per cent so that the sulfur in the system was about 0.02 per cent by weight of the acid.

Another portion of the same feed was treated under identical conditions without the supplemental treatment of a part of the recycle acid stream. In this operation all of the acid phase from the settling zone was recycled directly to the reactor. The sulfur concentration in the desired light alkylate fraction increased to 0.0034 per cent by weight of this fraction, or an increase in concentration of more than 60 per cent over that in the preceding method. The sulfur content of the system in this example was approximately 0.06 per cent by weight of the acid.

A comparison of the results obtained by the two methods of procedure just described clearly indicates the advantages of withdrawal and further treatment of at least a portion of the recycle acid stream and the acid-soluble oils contained therein. For example, withdrawal and treatment of the five per cent of recycle acid in the example reduced the sulfur content of the systems sufficiently to substantially lower the sulfur content of the desired fractions.

In the event the sulfur in the system begins to exceed the concentration allowable for satisfactory operation as evidenced in the transmission and increase of sulfur in the desirable alkylate fractions, larger amounts of acid-soluble oils may be recovered and desulfurized to reduce the sulfur content of the system. In the above examples, a concentration of sulfur between 0.02 and 0.06 per cent by weight of the acid results in a very low concentration of sulfur in the light alkylate fraction of the product, the higher value of 0.06 per cent effecting a concentration in the desired fraction of only about 0.003 per cent sulfur. Likewise, as the concentration of acid-soluble oils increases due to the formation of these oils during conversion, a quantity of the oils may be removed from the system to compensate for this production and to maintain a desirable concentration in the acid stream. In processes such as described herein in which the concentration of the acid is preferably 85 to 95 per cent, the concentration of the acid-soluble oils should not exceed about 10 per cent of the acid feed. Since about 1 to 2 per cent of acid soluble oils are formed in the conversion, this value may represent a satisfactory minimum concentration of these oils so that a preferred concentration of acid soluble oils may be from 1 to 10 per cent of the acid.

While the invention has been described in connection with a process of alkylation employing hydrofluoric acid where the acid-soluble oils are produced and recycled to the same process, it is not intended to limit the scope of the invention to such a process. If desired, these oils from one unit of hydrocarbon conversion in which an excess is being produced may be transferred to another unit of an identical or similar process in which additional desulfurizing agent would be beneficial. Also, these desulfurized oils may be recovered and used in other processes, not producing such oils, in which desulfurization in the reaction zone may be desirable. Since the oils described hereinbefore display an affinity for sulfur compounds, they may be used satisfactorily to remove sulfur in any conversion process in which the reaction products are not undesirably effected by their presence.

It is understood that various modifications and changes may be made without departing from the spirit of the invention and the scope of the following claims.

I claim:

1. In a process for the alkylation of hydrocarbons containing organic sulfur compounds in the presence of hydrofluoric acid catalyst, the improvement of adding acid-soluble oils which are formed during conversion of hydrocarbons in the presence of said hydrofluoric acid to the reactants in the reaction zone, separating said oils containing absorbed sulfur compounds from the effluent, desulfurizing at least a portion of said acid-soluble oils, and recycling said desulfurized oils to the reaction zone as the acid-soluble oils added thereto.

2. A process for the alkylation of paraffins with olefins which comprises reacting said paraffins and olefins in the presence of hydrofluoric acid, forming acid-soluble oils during the reaction, separating the acid having acid-soluble oils dissolved therein from the hydrocarbon effluent, recycling a portion of the separated acid to the reaction zone, treating a portion of the separated acid to recover acid-soluble oils therefrom, desulfurizing said acid-soluble oils, and recycling said desulfurized oils to the reaction zone to selectively absorb organic sulfur compounds in said paraffins and olefins.

3. A process for the alkylation of an isoparaffin-olefin mixture containing sulfur compounds as impurities which comprises contacting said isoparaffin-olefin mixture with hydrofluoric acid under alkylation conditions, forming an alkylate phase and an acid phase having acid-soluble oils dissolved therein, separating said alkylate from said acid phase, recovering acid-soluble oils from said acid phase, said acid-soluble oils having sulfur compounds selectively dissolved therein, desulfurizing at least a portion of said acid-soluble oils to reduce the sulfur content thereof, and recycling at least a portion of said desulfurized acid-soluble oils to said alkylation zone to selectively dissolve sulfur compounds therein.

4. In a process for the alkylation of low boiling isoparaffins with olefins in the presence of concentrated hydrofluoric acid as a catalyst, wherein the hydrocarbon reactants contain sulfur compounds as impurities therein, wherein acid-soluble oils are formed during the alkylation, and wherein the reaction mixture is separated into an acid phase and a hydrocarbon phase and the acid phase is recycled to the reaction zone, the method of removing sulfur from the system which comprises separating at least a portion of the acid soluble oils from the acid phase prior to its recycle to the reaction zone, desulfurizing said separated acid soluble oil, and returning said desulfurized acid-soluble oil to said reaction zone.

5. A process according to claim 4 in which a predetermined maximum sulfur content in the alkylate produced is maintained by desulfurizing a predetermined proportion of the acid-soluble oils produced sufficient to remove the necessary amount of sulfur from the system, and in which a predetermined concentration of acid-soluble oil is maintained in the reaction zone by removing a portion of the acid-soluble oil from the system.

6. In a process for the alkylation of hydrocarbons containing organic sulfur compounds in the presence of hydrofluoric acid catalyst, the improvement of adding acid-soluble oils which are formed during conversion of hydrocarbons in the presence of said hydrofluoric acid to the reactants in the reaction zone, separating said oils containing absorbed sulfur compounds from the effluent, desulfurizing at least a portion of said acid-soluble oils, and recycling said desulfurized oils to the reaction zone as at least a portion of the acid-soluble oils added thereto.

7. A process for the desulfurization of hydrocarbons containing organic sulfur compounds which comprises selectively extracting said sulfur compounds by contacting the hydrocarbons containing the same with a desulfurized acid-soluble oil obtained during the alkylation of paraffins with olefins in the presence of hydrogen fluoride as a catalyst, separating said oils with the absorbed sulfur compounds from the treated hydrocarbons, desulfurizing said oils for the removal of said sulfur compounds and recycling the desulfurized acid-soluble oils for the selective extraction of sulfur compounds.

JOHN GORDON ALLEN.